UNITED STATES PATENT OFFICE.

CARL BOSCH, OTTO SCHMIDT, AND ALWIN MITTASCH, OF LUDWIGSHAFEN-ON-THE-RHINE, GERMANY, ASSIGNORS, BY MESNE ASSIGNMENTS, TO THE CHEMICAL FOUNDATION, INC., A CORPORATION OF DELAWARE.

CATALYST AND METHOD OF MAKING SAME.

1,391,666.   Specification of Letters Patent.   Patented Sept. 27, 1921.

No Drawing.   Application filed June 4, 1914.   Serial No. 842,956.

*To all whom it may concern:*

Be it known that we, CARL BOSCH, OTTO SCHMIDT, and ALWIN MITTASCH, citizens of the German Empire, residing at Ludwigshafen-on-the-Rhine, Germany, have invented new and useful Improvements in Catalysts and Methods of Making Same, of which the following is a specification.

Our invention relates to catalytic mixtures by means of which hydrogenization and dehydrogenization can be carried out rapidly, with certainty and at comparatively low temperatures. We have discovered that these advantages can be obtained by employing as the catalytic agent an intimate mixture of (1) one or more of the following metals:—iron, nickel, cobalt and copper (which are for the purpose of this invention equivalents and which we hereinafter refer to as the catalytic metal), with (2) an artificially prepared oxygen-containing compound of silicon. These artificially prepared oxygen-containing compounds of silicon which promote the activity of the catalytic metal we refer to hereinafter as promoters.

In order to obtain the advantages of this invention it is necessary to effect an intimate mixture of the catalytic metal and the promoter. By the employment of the aforesaid chemically prepared silicon compounds we can produce a catalytic agent with a very long life and of excellent activity. An intimate mixture of nickel carbonate and alkali silicate and preferably a carrier can be heated and reduced with hydrogen, or silica can be precipitated in a very finely divided form by the combustion of a mixture of nickel carbonate with an organic silicon compound, such as silicon ethyl ester, whereupon the mixture obtained is submitted to reduction, or colloidal silica, or a natural or artificial zeolite may be employed. If insoluble silicates are to be employed as promoters, these should preferably be brought into intimate mixture with the compound which is subsequently to give rise to the metallic agent, by precipitation from suitable soluble salts or other compounds.

It is particularly advantageous for the purpose of preparing a very active contact mass to prepare the catalytic metal from carbonaceous salts or mixture of salts thereof, for instance, from carbonates or from formates. It is further often useful to add to the mixture, bodies of inorganic or organic nature, which act either as carriers, or as binding agents or which increase the porosity of the contact mass. We mention, for instance, asbestos, charcoal and pumice. It is advisable, however, to avoid the introduction of bodies such as chlorin, sulfur, arsenic and lead, which may in the elementary form act as contact poisons, although the new contact mixtures according to the present invention are not so sensitive to the action of poisons as are the pure metals.

The catalytic metal is preferably employed in a state of fine division, but sometimes a more compact form, such as wire netting, or wool, or sheet form can be used.

The proportion of the components employed in the catalytic mixture may be considerably varied, even an addition of one per cent., or less of the said promoters often producing favorable action.

In those cases in which reduction has to be resorted to in order to obtain the catalytic metal, such reduction is preferably carried out by means of pure hydrogen or other suitable agent at as low a temperature as possible, and if the catalytic mixture after having been reduced with hydrogen, has to be exposed to the air, it is generally advisable previously to drive away any excess of hydrogen by passing an indifferent gas such as carbon dioxid over the mixture and thus to avoid even superficial oxidation of the metal.

The catalytic mixtures, according to this invention, can be used for the hydrogenization and dehydrogenization of compounds containing carbon and are of particular value for converting phenol into cyclohexanol, for reducing nitrobenzene to anilin, for the hardening of fats and fatty acid and for the conversion of oxids of carbon into hydrocarbons.

The catalytic reaction according to this invention can be carried out either at ordinary pressure or under increased pressure, for instance, above 50 atmospheres, and in most cases when employing nickel, proceeds sufficiently rapidly at temperatures considerably below 180° C.

The following examples will serve to illustrate further the nature of this invention, which, however, is not confined to these examples. The parts are by weight.

*Example 1.*

Mix together to a paste 130 parts of coarse pumice, 10 parts of water, 50 parts of a 42% solution of waterglass, and 47 parts of nickel carbonate. Dry the lumps, and reduce with hydrogen at from 300–350° C. A very active catalytic agent is produced which retains its activity for a long time and is suitable for the continuous conversion of phenol into cyclohexanol by means of hydrogen at a temperature of 100–120° C.

*Example 2.*

Mix together to a paste with water 400 parts of coarse pumice, 40 parts of a 42% waterglass solution and 36 parts of copper carbonate. Then dry the mass and reduce it with hydrogen. On passing a mixture of methyl cyclohexanol and nitrogen at a temperature of from 200–280° C. over the catalytic agent dehydrogenization takes place and an excellent yield of methyl cyclohexanone is obtained.

*Example 3.*

Pass a mixture of nitrobenzene vapor and an excess of hydrogen at about 200° C. over a catalytic mixture containing 20 parts of silica precipitated on to finely divided copper, whereupon reduction takes place with the formation of anilin.

*Example 4.*

Mix to a paste with a little water 11 parts of glass wool which is rich in alkali silicate and 40 parts of nickel carbonate. Then dry the mixture and treat it with hydrogen at from 300–350° C. In this way a very active catalytic agent is obtained which is suitable for the continuous conversion of phenol into cyclohexanol at from 100–120° C.

*Example 5.*

Take a hot concentrated solution of 13 parts of nickel nitrate and 3 parts of aluminium nitrate and add, while stirring, a hot concentrated solution containing 5 parts of sodium silicate, and 10 parts of sodium carbonate. Then filter, wash well, reduce and immerse the contact mass in linseed oil, and then allow hydrogen to react on the mixture in motion at from 100–120°.

If desired, the contact mass before being dried and reduced can be formed into suitable shapes, the silicate serving the double purpose of promoter and binding agent, and the oil be allowed to trickle over the formed catalytic mass while passing hydrogen through the apparatus.

*Example 6.*

Stir from 1 to 2 parts of finely divided precipitated silica (for instance, silicic anhydrid) into a hot solution of 10 parts of nickel nitrate in 30 parts of water, and then, while continuously stirring, pour in a solution of 6 parts of sodium carbonate in 30 parts of water. Then filter off the precipitate, wash it well, dry and reduce it, and then grind the mass with cottonseed oil, and treat the mixture with hydrogen at, say, 120° C.

The activity of the contact mass can be increased by the addition of, for instance, aluminium oxid or boric acid.

Now what we claim is:—

1. A catalyst composed of finely divided nickel intimately associated with dry, precipitated non-colloidal silica.

2. A catalyst composed of finely divided nickel intimately associated with dry, precipitated non-colloidal silica supported on an inactive carrier.

3. A method of preparing a catalyst which comprises drying an intimate water-containing mixture of an organic nickel compound and a soluble compound of silicon, then reducing the dried mixture by hydrogen to thereby produce a catalyst composed of finely divided nickel intimately associated with dry precipitated non-colloidal silica.

4. A method of preparing a catalyst which comprises drying an intimate water-containing mixture of nickel carbonate and a soluble compound of silicon, then reducing the dried mixture by hydrogen to thereby produce a catalyst composed of finely divided nickel intimately associated with dry, precipitated non-colloidal silica.

5. A method of preparing a catalyst which comprises drying an intimate water-containing mixture of nickel carbonate and compound and water-glass, then reducing the dried mixture by hydrogen to thereby produce a catalyst composed of finely divided nickel intimately associated with dry, precipitated non-colloidal silica.

6. A method of preparing a catalyst which comprises drying an intimate water-containing mixture of nickel carbonate and water-glass, then reducing the dried mixture by hydrogen to thereby produce a catalyst composed of finely divided nickel intimately associated with dry, precipitated non-colloidal silica.

In testimony whereof we have hereunto set our hands in the presence of two subscribing witnesses.

CARL BOSCH.
Dr. OTTO SCHMIDT.
ALWIN MITTASCH.

Witnesses:
CH. SCHNEIDER,
J. ALEC. LLOYD.